United States Patent [19]

Micciche

[11] Patent Number: 5,435,961
[45] Date of Patent: Jul. 25, 1995

[54] METHOD AND TOOL FOR FORMING A PATTERNED GASKET

[75] Inventor: Mark D. Micciche, Webster, N.Y.

[73] Assignee: Xerox Corporation, Stamford, Conn.

[21] Appl. No.: 177,016

[22] Filed: Jan. 14, 1994

[51] Int. Cl.[6] .............................................. B28B 13/02
[52] U.S. Cl. .................................. 264/319; 264/323; 425/190; 425/375; 425/380; 425/467; 425/468
[58] Field of Search ............... 425/467, 468, 380, 376, 425/190, 192 R, 375, 464, 809; 264/176.1, 177.1, 323, 319, 177.16

[56] References Cited

U.S. PATENT DOCUMENTS

| Re. 32,572 | 1/1988 | Hawkins et al. | 156/626 |
|---|---|---|---|
| 2,913,763 | 11/1959 | Longstreth et al. | 425/467 |
| 2,946,090 | 7/1960 | Houvener | 425/380 |
| 3,043,711 | 7/1962 | Beale | 425/809 |
| 3,166,795 | 1/1965 | Joffe | 425/468 |
| 3,334,792 | 8/1967 | De Vries et al. | 425/190 |
| 3,792,951 | 2/1974 | Meyers | 425/380 |
| 4,005,960 | 2/1977 | Herdzina, Jr. | 425/464 |
| 4,248,823 | 2/1981 | Bader et al. | 425/368 |
| 4,463,359 | 7/1984 | Ayata et al. | 346/1.1 |
| 4,526,740 | 7/1985 | Adams et al. | 425/380 |
| 4,567,493 | 1/1986 | Ikeda et al. | 346/140 |
| 4,571,599 | 2/1986 | Rezanka | 346/140 |
| 4,577,202 | 3/1986 | Hara | 346/140 |
| 4,643,864 | 2/1987 | Martini | 425/375 |
| 4,735,169 | 4/1988 | Cawston et al. | 425/467 |
| 4,935,750 | 6/1990 | Hawkins | 346/140 |
| 5,176,925 | 1/1993 | Weber et al. | 425/467 |
| 5,273,704 | 12/1993 | Scholl et al. | 425/464 |

Primary Examiner—Mathieu D. Vargot
Attorney, Agent, or Firm—Tallam I. Ngati

[57] ABSTRACT

A method and tool are provided for forming a patterned gasket bead on a surface. The tool includes a first portion which has a first recess that defines a first recess surface, and a mateable second portion having a second recess defining a second recess surface. The tool also includes a gasket material flow path that has a chamber section, and that is formed by the first and second recess surfaces of the first and second portions mated together. The tool further includes a gasket patterning member that is mounted within the chamber section of the gasket material flow path. The patterning member as mounted within the chamber section defines, with the first and second recess surfaces, a patterned extrusion opening through a discharge end of the first and second portions for extruding a patterned flow of gasket material.

20 Claims, 7 Drawing Sheets

METHOD AND TOOL FOR FORMING A PATTERNED GASKET

BACKGROUND OF THE INVENTION

This invention relates to an apparatus and method of forming gaskets, and, in particular, to a method and device for forming a patterned gasket as, for example, between an ink supply unit and a printhead of an ink jet printer.

As is well known, thermal ink jet printers use print cartridges in which thermal energy that is selectively produced by resistors located in capillary-filled ink channels near channel terminating nozzles or orifices, vaporize the ink momentarily and so form bubbles on demand within selected channels. Each temporary bubble so formed causes an ink droplet to be expelled and propelled toward a proximately supported recording medium. The print cartridge may be incorporated either movably in a carriage type printer or fixedly in a pagewidth type printer. The carriage type printer generally has a relatively small print cartridge, containing the ink channels and nozzles. The print cartridge usually consists of a printhead that is sealingly attached to a disposable ink supply unit. In use, the print cartridge mounted on a movable cartridge is reciprocated to print one swath of information at a time on a stationarily held recording medium, such as paper. After a swath of information is printed, the paper is stepped a distance equal to the height of a printed swatch, so that the next swath printed will be contiguous therewith. The procedure is repeated until an entire page is printed. For an example of a carriage type printer, refer to U.S. Pat. No. 4,571,599 to Rezanka.

In contrast, a pagewidth type printer has a stationary print cartridge having a length equal to or greater than the width of the recording medium or sheet of paper. The paper, in this case, is continually moved past the fixed or stationary pagewidth print cartridge and in a direction that is normal to the axis of the print cartridge. For an example of a pagewidth type printer, refer to U.S. Pat. No. 4,463,359 to Ayata et al., especially FIGS. 17 and 20 entitled "Fabricating Process for Large Array Semiconductive Devices," filed Dec. 5, 1988, and assigned to the same assignee as the present invention.

U.S. Pat. No. Re. 32,572 to Hawkins et al. discloses a thermal ink jet printhead and method of fabrication. As disclosed, a plurality of printheads may be concurrently fabricated by forming a plurality of sets of heating elements with their individual addressing electrodes on a first substrate, generally a silicon wafer, and by etching corresponding sets of channel grooves with a common recess for each set of grooves in a second substrate or silicon wafer. The first substrate and second substrate are then aligned and bonded together so that each channel groove has a heating element aligned therewith. Individual printheads are then obtained by milling away unwanted substrate or silicon material in order to expose the addressing electrode terminals, and by dicing the substrate into separate printheads. To form a print cartridge, each printhead is later sealed to an ink supply unit (to be discussed below).

U.S. Patent No. 4,567,493 to Ikeda et al. and U.S. Pat. No. 4,577,202 to Hara disclose a liquid jet recording head, including a plurality of protection layers, one of which has a region that directly contacts the liquid. A principal function of the protection layer is to prevent penetration by the liquid and therefore prevent a failure mode for the bubble generating resistors and their addressing electrodes. Hara discloses in FIG. 2b a tubing connection 220 and the patent to Ikeda et al. omits details of the ink supply unit interface.

U.S. Pat. No. 4,935,750 issued to Hawkins and commonly assigned with this application suggests the general concept of depositing by a photo-patterning or a screen-printing process, a compliant gasket material, such as silicone, around thermal ink jet printhead ink inlets. The surface of the deposited material is then coated with a reflowable and curable adhesive for subsequent use as a 'dry' gasket for attaching and sealing the printhead to an ink supply unit to form a thermal ink jet print cartridge.

The suggested photo-patterning process involves intensive photolithographic printing and etching of the sealing material, and is, therefore, relatively more expensive than competitive processes. Gaskets formed by this process are of the dry type because they are cured prior to excess sealing-surface material being trimmed. In their subsequent use to manufacture thermal ink jet print cartridges, which require precise and effective sealing around each, or around a few of the, minute ink inlets of an array of such inlets, dry gasket seals have not proven to be as precise and effective as desired.

On the other hand, the screen-printing process involves the use of a screen and a squeegee device for forcing sealing material through the screen. As such, screen-printing has also not proven to be as economical, or as precise and effective as desired for print cartridge manufacture. The gasket seals produced by the screen-printing process are of the 'dry' type as described under U.S. Pat. No. 4,935,750. Accordingly, the gasket seals produced by this method also are not as precise and effective in sealing around each or around a few minute ink inlets of an array of such inlets in a thermal ink jet print cartridge. In addition, each screen used in the screen printing process has a fixed thickness and gasket pattern therein and, therefore, cannot be varied to produce thinner or thicker gasket beads. Furthermore, because the screens are exposed during use, the gasket material tends to cure and dry on portions of each screen during such use, thereby requiring frequent and costly cleaning, or thereby distorting the shape, size and hence the effectiveness of subsequently produced gasket beads.

SUMMARY OF THE INVENTION

In accordance with one aspect of the present invention, there is provided a tool for forming a patterned gasket on a surface. The tool comprises a first portion which has a first recess that defines a first recess surface, and a mateable second portion having a second recess defining a second recess surface. The tool also comprises a gasket material flow path that includes a chamber section, and that is formed by the first and second recess surfaces of the first and second portions mated together. The tool further comprises a gasket patterning member that is mounted within the chamber section of the gasket material flow path. The patterning member as mounted within the chamber section defines, with the first and second recess surfaces, a patterned extrusion opening through a discharge end of the first and second portions for extruding a patterned flow of gasket material.

Pursuant to another aspect of the present invention, there is provided a method of forming a patterned gasket on a surface comprising the steps of (a) forming a gasket material flow path and a chamber section thereof to and through a discharge end of a gasket tool frame; (b) mounting a gasket patterning member inside the chamber section of the flow path to define a patterned extrusion opening through the discharge end; and (c) injecting flowable gasket material into the gasket material flow path for flow across the patterning member towards the discharge end positioned proximate the surface, and extruding a patterned gasket bead through the patterned extrusion opening onto the surface.

Other features of the present invention will become apparent from the following drawings and description.

BRIEF DESCRIPTION OF THE DRAWINGS

In the detailed description of the invention presented below, reference is made to the drawings, in which.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 9:
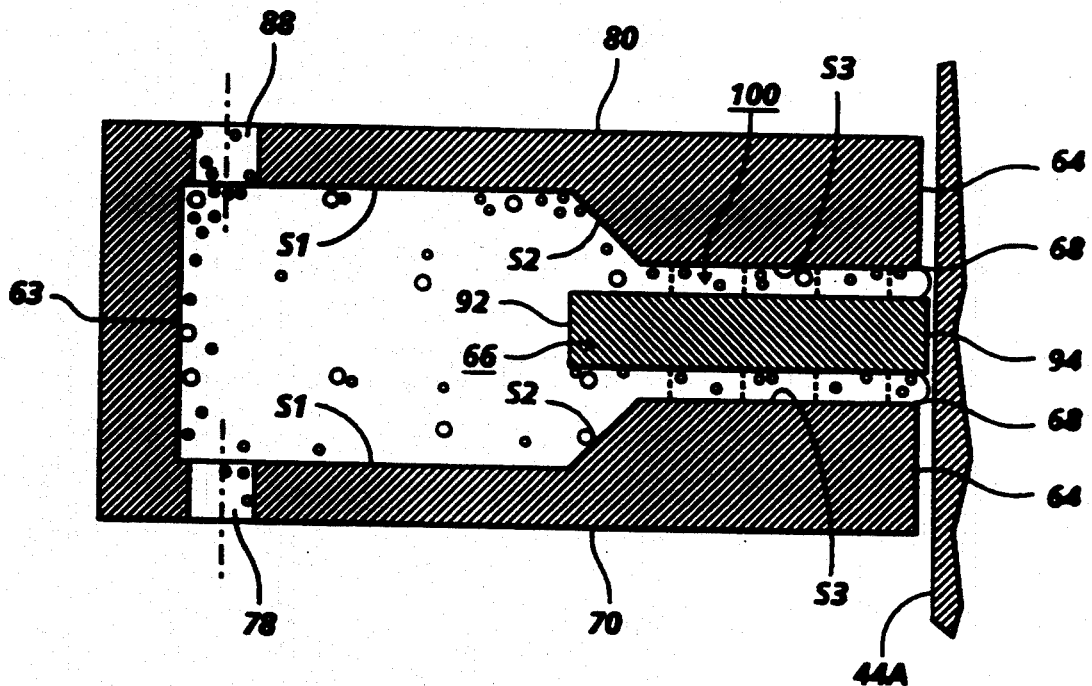
FIG. 9 is an isometric view of a thermal ink jet printer including a print cartridge that has been sealed according to the present invention.

Referring now to FIG. 9, a thermal ink jet printer is shown generally as 10, and includes a frame 11, means 12 for supporting a recording medium 14 (such as a sheet of paper), and a print cartridge 16. The print cartridge 16 includes a printing ink supply unit 18 that is sealed to a printhead 20.

As shown, the print cartridge 16 is removably mounted on a carriage 22 and powered through element 31 for translation back and forth on a guide rail 24, and within a printing zone 32, as indicated by the arrow 26. During each such translation in a direction of the arrow 26, the recording medium or sheet 14 is stationary in order to allow the print cartridge to print a swath of information thereon. At the end of each directional translation, the recording medium or sheet 14 is stepped in the direction shown by the arrow 34 and for a distance equal to the height of a swath of information being printed.

As stated above, the print cartridge 16 includes an ink supply unit 18 that is sealed to a printhead 20 for supplying the ink required for printing the swath of information. The ink supply unit 18 as disclosed, for example, in commonly assigned U.S. application Ser. No. 07/974,362 filed Nov. 12, 1992, includes a housing which defines an ink storage chamber as well as an ink outlet aperture for supplying ink from the chamber to a printhead 20.

Figure 1:
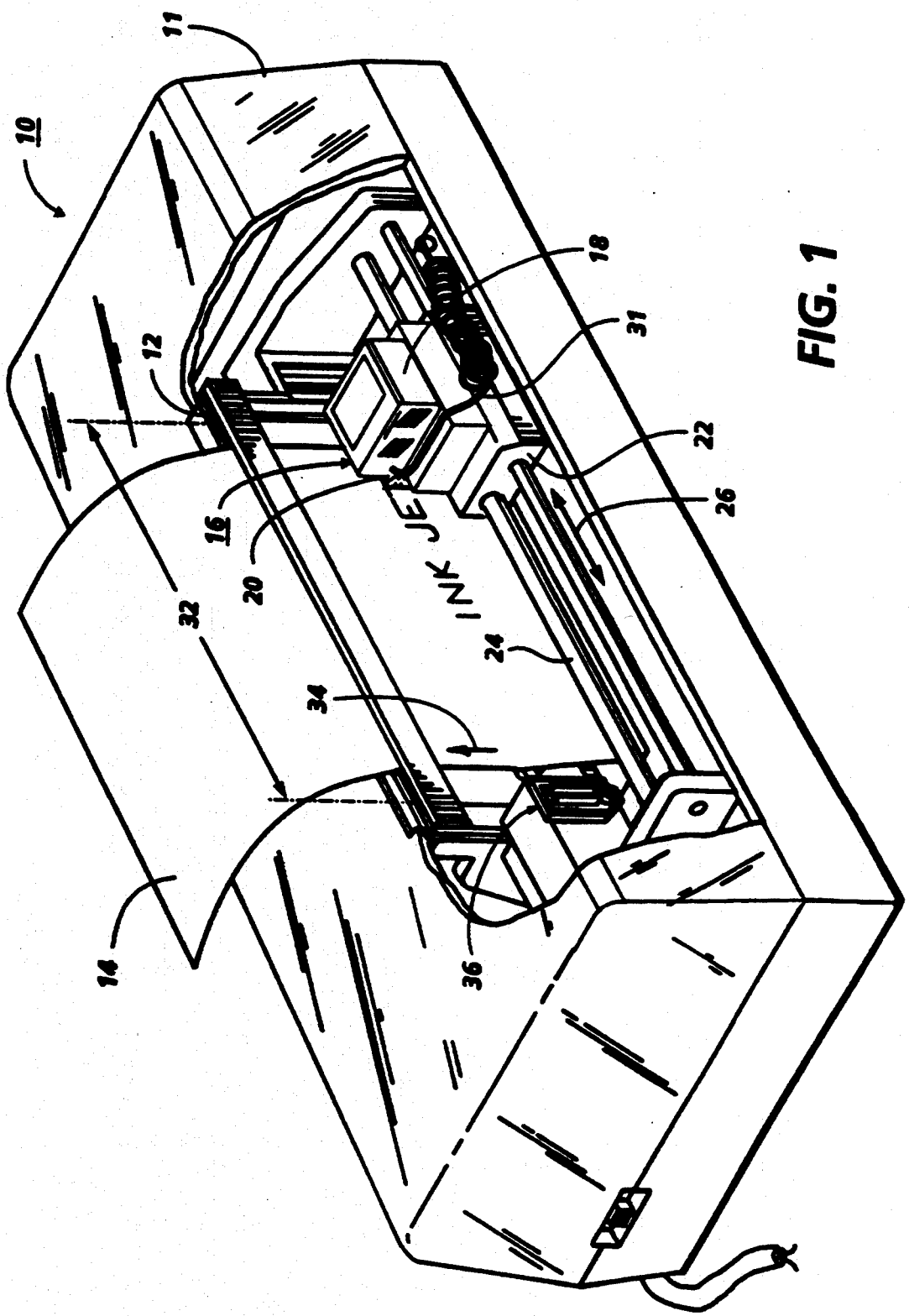
FIG. 1 is an enlarged schematic isometric view of the front portion of the printhead of the print cartridge of FIG. 9 mounted on a daughter board and showing droplet emitting nozzles as well as an ink inflow surface and a plurality of ink inflow apertures therethrough.

Referring now to FIG. 1, the printhead 20 as disclosed, for example, in commonly assigned U.S. Pat. No. Re. 32,572, includes an ink input or inflow aperture 36 for receiving ink (from the ink supply unit 18) into an ink manifold (not shown). As shown, however, the printhead 20 is composed of first and second substrates or plates 40 and 42, respectively. The first or top substrate 40 has the ink inflow aperture 36 formed from a surface (the top surface) 44A through to the opposite or bottom surface 44B. On such opposite or bottom surface 44B of the substrate 40, an array or plurality of grooves or channels (not shown) are formed. Each channel extends from a point of communication with the inflow aperture 36, in the direction of the arrow 45, towards and through a front edge 46 of the substrate 40. The second or lower substrate 42 includes on its top surface 48 a corresponding array of electrically addressable heating electrodes 50A with terminals 50B, and each having a heating element that lies perpendicular to the surface 51 of substrate 42. As shown, the first and second substrates 40, 42 respectively are aligned and bonded together so that the open ends of the grooves or channels on surface 44B form an array of ink droplet emitting nozzles 52 in the edge 46, and such that each channel or groove includes an addressable heating element.

As further shown, the printhead 20 is permanently mounted on a daughter board 55, and may include an insulative layer 53, that is etchable, between the surfaces 44B and 48 in order to expose the heating elements of the addressable electrodes within the channels or grooves of the nozzles 52.

For sealing the printhead 20 to an ink supply unit 18, a bead of gasket sealing material is formed on the surface 44A around the ink inlet aperture or apertures 36. The surface 44A of the printhead 20 is then sealed against an ink supply unit 18 such that the ink outlet aperture of the ink supply is aligned with the apertures 36.

Figure 2:
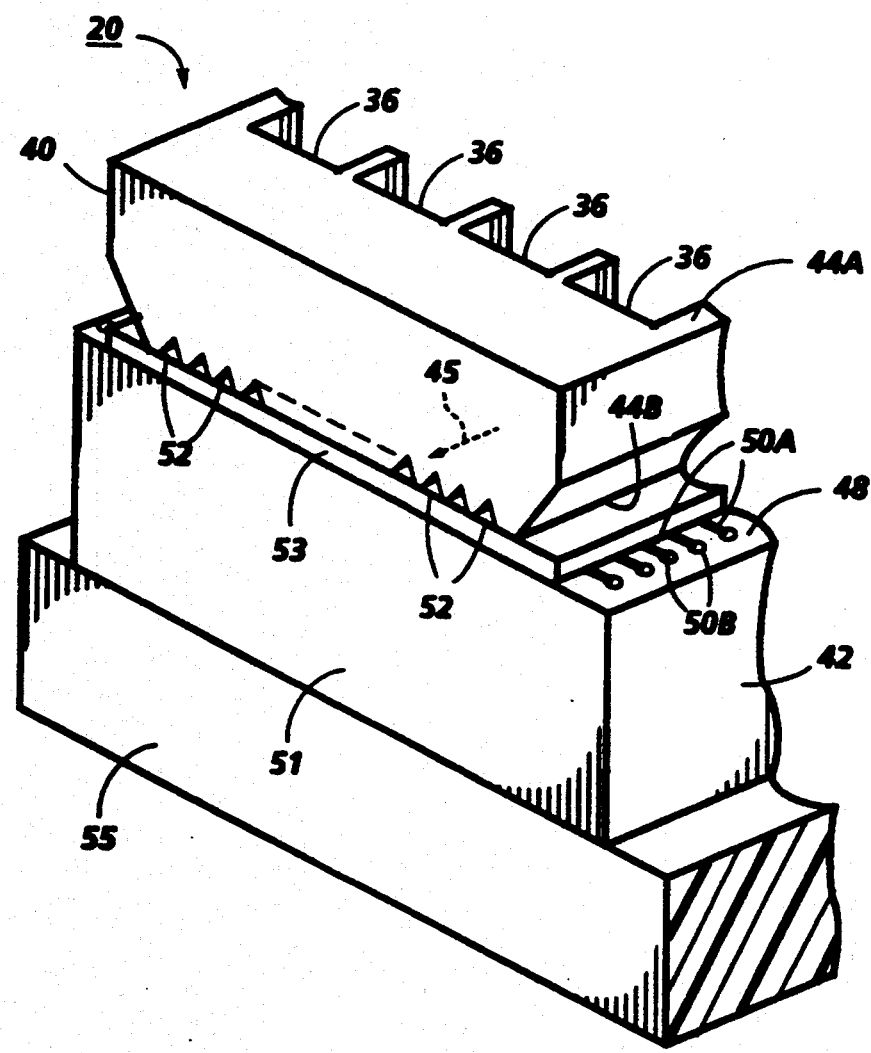
FIG. 2 is an isometric view of the ink inflow surface of a printhead, and of the discharge end of the gasket tool of the present invention, showing a patterned gasket bead formed on such surface for sealing the printhead to an inlet supply unit.

Referring now to FIG. 2, a patterned bead 60 of gasket material is formed on the surface 44A of the printhead 20 according to the present invention. As shown, the bead 60 is formed to a desired bead thickness and around the ink inflow aperture or apertures 36 of a single printhead 20. The gasket material which is flowable can, for example, comprise a room temperature-vulcanizing silicon rubber such RTV ® (a trademark of General Electric Co.). For the method of the present invention, a patterned gasket bead forming tool shown generally as 62 is employed.

To form the patterned bead 60 of gasket material using the tool 62 of the present invention, a gasket material flow path is formed within the tool 62, to and through a discharge end 64 of the tool. As shown, the path is defined by first and second portions 70 and 80, respectively of the tool, and by a patterning member 66. Patterning member 66 is mounted between the first and second portions 70 and 80 respectively, and through the discharge end 64 for forming a patterned extrusion opening 68, of a desired shape and width through the discharge end 64. As such, with the discharge end 64 of the tool 62 positioned proximate the surface 44A of a printhead, and aligned around the ink inlet apertures 36 thereof, flowable gasket material can be injected into, and extruded through the extrusion opening 68 onto the surface 44A.

Figure 3:
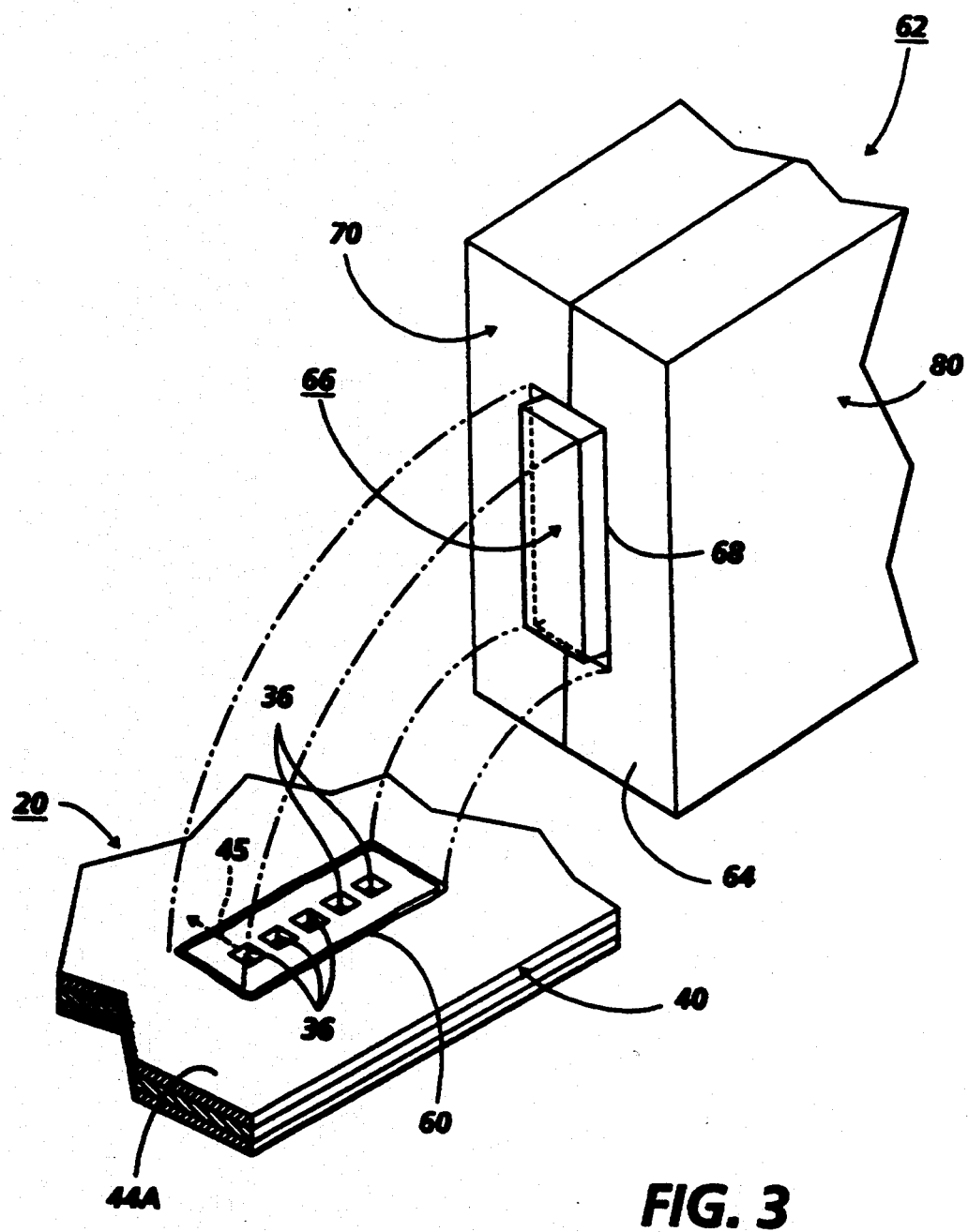
FIG. 3 is a top plan view of the first portion of the gasket forming tool of the present invention.
Figure 4:
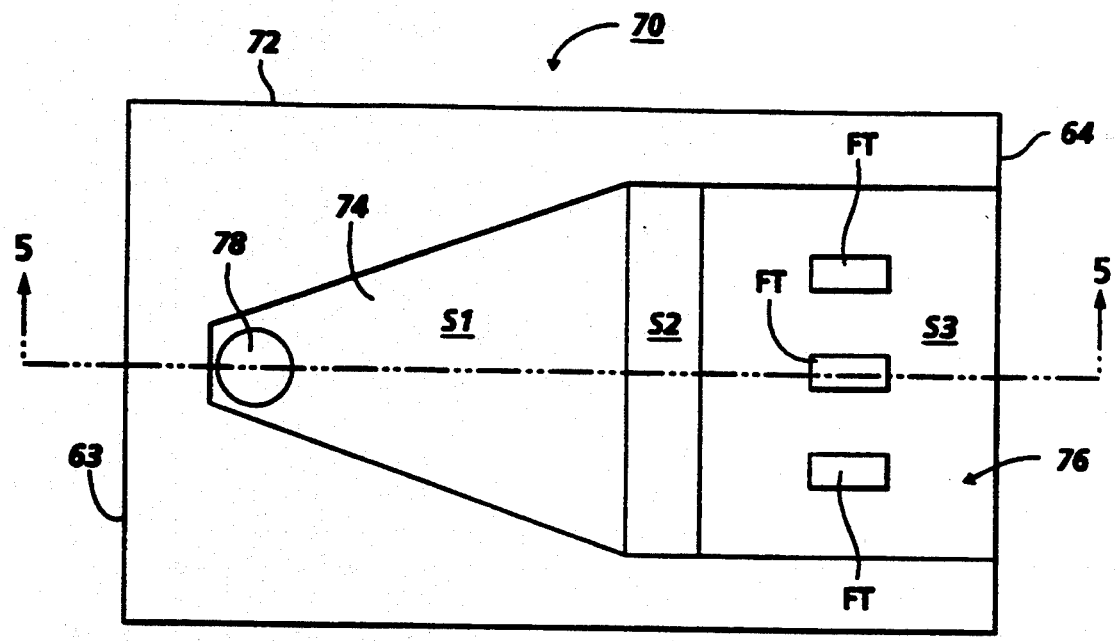
FIG. 4 is a cross-sectional view of the portion of FIG. 3 as taken along view plane A—A.
Figure 5:
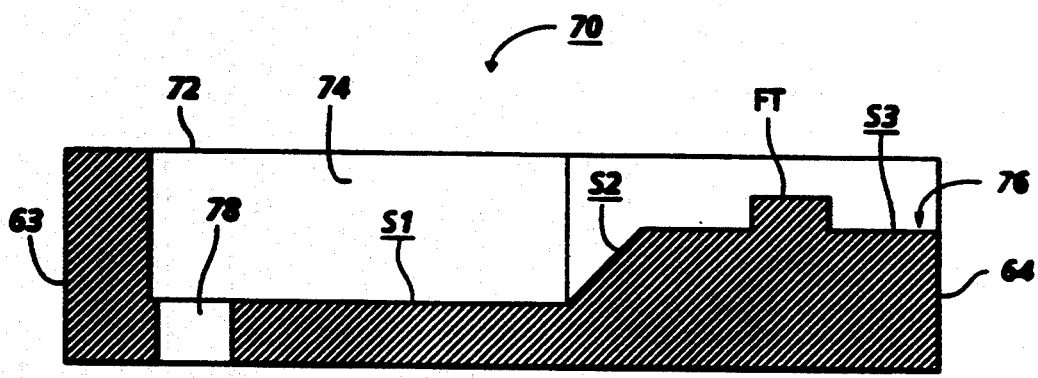
FIG. 5 is a top plan view of the patterning member of the gasket forming tool of the present invention.

Referring now to FIGS. 2, 3 and 4, one of the portions, for example, the first portion 70, of the tool 62 is illustrated. In a preferred embodiment of the tool 62, the first and second portions 70 and 80, respectively, are identical, and hence only one will be described in detail. As illustrated in FIGS. 4 and 5, the first portion 70 has a main body 72 which is generally flat and rectangular, a rear end 63, and a discharge end 64. As further illustrated, the first portion 70 has a recess 74 formed therein from a point towards the rear end 63 and frontwardly through the discharge end 64. The recess 74 defines a recess surface shown generally as 76 that includes a plurality of sections, for example, sections S1, S2 and S3. As shown, the first section S1 is located toward the rear end 63 and is in a deep section of the recess 74. In this deep section S1 of the recess surface 76, a gasket material inlet opening 78 is formed from the outside of the tool portion 70 into communication with the recess 74.

On the other hand, the third section S3 is located towards and through the discharge end 64, and is in a shallow section of the recess 74. A series (3) of first tabs FT is formed each projecting from the surface S3 into the recess 74. The second section S2 is accordingly a transitional and an inclined section as shown, connecting the deep section surface S1 and the shallow section surface S3 of the recess 74.

Because the first portion 70 and second portion 80 are preferably identical, the second portion 80 can accordingly be seen (FIG. 8 BELOW) as including a main body 82, a rear end 63 and a discharge end 64. Additionally, it includes a recess 84 defining a recess surface 86 which has a plurality of correspondingly identical surface sections S1, S2 and S3. A gasket material inlet opening 88 is formed into the deep section S1, and a series of first tabs FT are formed in the shallow section S3, each projecting into the recess 84.

Figure 6:
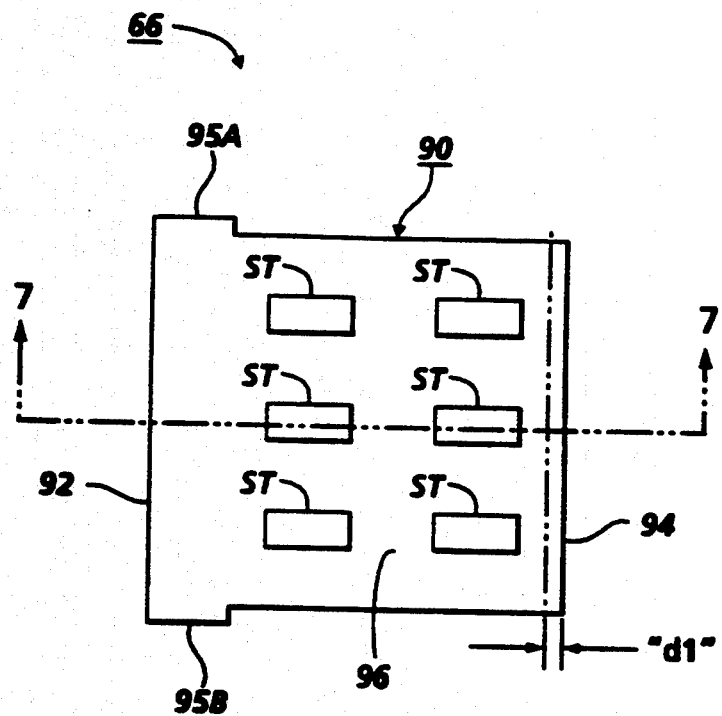
FIG. 6 is a cross-sectional view of the patterning member of FIG. 5 as taken along view plane B—B.

Referring now to FIGS. 5 and 6, the patterning member 66 of the tool 62 is illustrated. As shown, the patterning member 66 has a thin, flat and generally rectangular main body 90 that includes a rearward end 92 and a front end 94. The main body 90 includes a pair of flange portions 95A, 95B, one on each edge of the rear end 92. Advantageously, the main body 90 in addition has an overall rear-to-front dimension that exceeds the rear-to-front dimension of the third section S3 of the surfaces 76, 86 respectively of the portions 70 and 80. As further shown, the main body 90 has generally flat top and bottom surfaces 96, 98 respectively, and a series of second tabs ST each projecting from each such flat surface.

As shown, the series of second tabs ST on each surface 96, 98 of the patterning member 66, are arranged into two rows. The rows are spaced apart by a back-to-front distance substantially equal to the back-to-front dimension of each first tab FT on any of the first and second portions 70, 80, respectively. In addition, in each such row of the second tabs ST, adjacent tabs are spaced such that the second tabs ST of one row are aligned with those of the adjacent row, and as well with a corresponding first tab FT on the tool portions 70 and 80. Both the series of second tabs ST on the patterning member 66, and the first tabs FT on the first and second portions 70,80, respectively, are formed offset significantly from the front, discharge end 64 of the tool 62 in order not to interfere with the extrusion opening 68.

Figure 7:
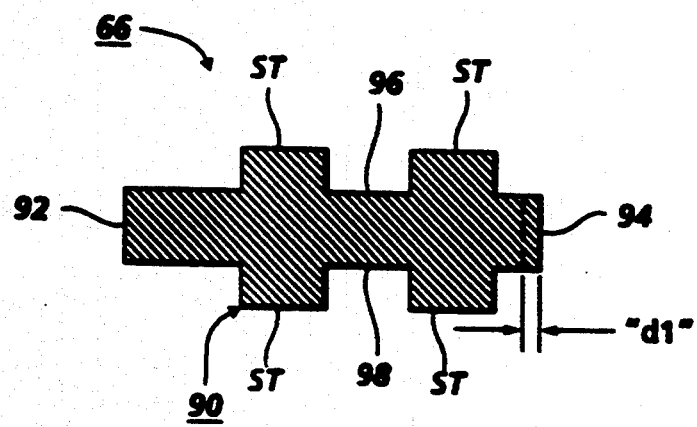
FIG. 7 is an exploded view of the patterning member and the first and second mateable portions of the patterned gasket forming tool of the present invention.
Figure 8:
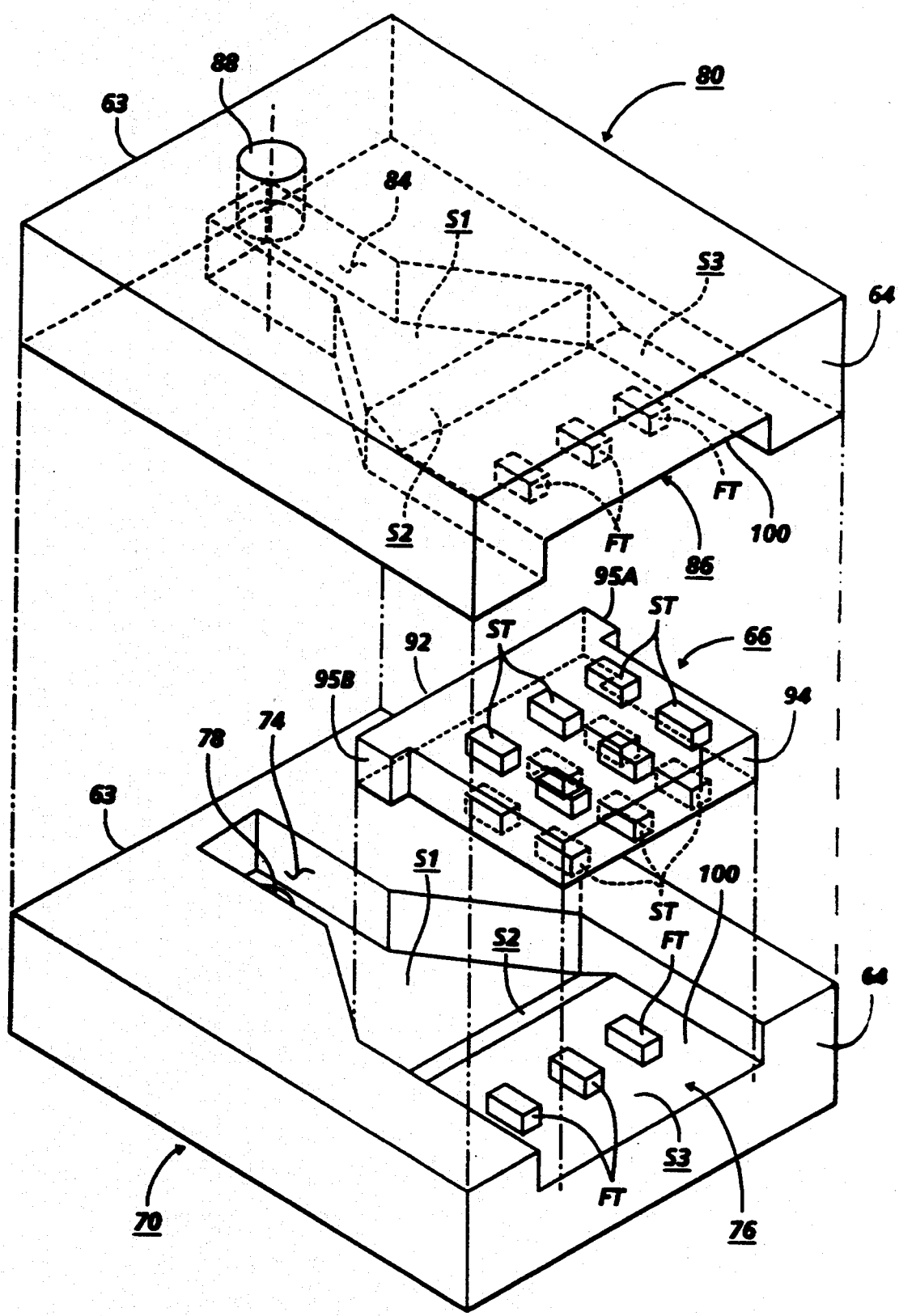
FIG. 8 is a cross-sectional area of the patterning tool of the present invention showing gasket material flow therethrough.

Referring now to FIGS. 7 and 8, the first and second portions 70 and 80, respectively, are mateable by means (not shown) or can be orientated, aligned and removably mounted one to the other. When mated or mounted as such, the recess surfaces 76 and 86 thereof cooperate to form the gasket material flow path therebetween which includes a chamber section 100. The flow path allows gasket material injected thereinto through the openings 78 and 88 to flow frontwardly through the chamber section 100 to the discharge end 64. The chamber section 100 is more particularly defined by the S3 section surfaces of the recess surfaces 76 and 86 of the portions 70 and 80, and adjoins the discharge end 64.

Still referring to FIGS. 7 and 8, the patterning member 66 is inserted into the chamber section 100 of the flow path such that the first tabs FT on each portion 70, 80 interlock within the back-to-front distance between a corresponding pair of second tabs ST on the patterning member 66. The rear end flange portions 95A, 95B of the patterning member 66 serve to align the interlocking tabs crosswise, and to space the edges of the main body 90 of patterning member 66 from the edges of the chamber section 100. The interlocking tabs FT and ST which preferably each project a substantially equal distance from its base surface, serve to space the surfaces 96, 98 of the patterning member 66 from the S3 section surfaces of the first and second portions 70 and 80, respectively. The spaces so created along the edges and surfaces of the patterning member 66, are useful for forming the patterned extrusion opening 68 (FIG. 2) at the discharge end 64 of the tool 62. As shown more clearly in FIGS. 2 and 8, when the patterning member 66 is mounted or inserted within the chamber section 100 as above, its front end 94 advantageously will project significantly by the distance "d1" beyond the discharge end 64 of the first and second portions 70 and 80, respectively.

As disclosed, the gasket material flow path has a plurality of inlet or input openings 78, 88, located through the sides of the first and second portions 70 and 80 of tool 62 into the flow path. Alternatively, it is understood that such openings into the flow path can be located anywhere on the tool 62 provided that they are upstream of the chamber section 100 of the material flow path. In addition, although a plurality of inlet or input openings is shown, it is understood that a single such opening can work as well.

Such an opening or openings can be made connectable, for example, to a pneumatically controlled gasket material supply apparatus for injecting gasket material into and through the tool 62. According to the present invention, in order to prevent the gasket material from sticking to the patterning member and to the first and second portions 70 and 80 of the tool 62, each preferably is made of a non-sticking material such as DELRIN ® (a trademark of the DuPont Company).

Referring particularly to FIG. 8, gasket material injected as such through the inlet or input openings 78 and 88 first will fill a reservoir section of the flow path as defined by the deep section surfaces S1 of the first and second portions 70, 80, respectively. The reservoir section serves to absorb any fluctuations in the inlet pressure of the gasket material. Such absorption advantageously prevents the fluctuations from detrimentally affecting the size and uniformity of a bead of gasket material formed through the extrusion opening 68.

The inclined or narrowing section surfaces S2 then serves to channel the flowing gasket material into the chamber section 100, and to increase the material flow pressure over the patterning member 66 mounted therein. At the rear end 92 of the patterning number 66, gasket material contacts and flows around the flange portions 95A, 95B (not shown) and then continues forwardly over and along the edges of the main body 90, for discharge through the patterned extrusion opening 68. The gasket material similarly also contacts and flows around the interlocking tabs which are recessed significantly from the discharge end 64 of the tool 62.

According to the present invention, the cross-sectional area of the chamber section 100 is designed so that it follows the cross-sectional area of the patterning member 66. For example, both are disclosed as being generally rectangular, but equally could both be cylindrical or other desired shape. In addition, in order to form a desired shape patterned extrusion opening, the cross-sectional area of the patterning member 66 is importantly made less than that of the chamber section 100. That results in spacings around the mounted patterning member, and hence in the patterned extrusion opening 68 at the discharge end 64. Accordingly, the width of the extrusion opening 68 at any point is essentially the difference between the cross-sectional areas of the chamber section 100 and patterning member 66 at such point. A tool 62 can therefore be supplied with a plurality of interchangeable patterning members 66 of different and varying cross-sectional areas. Furthermore, the distance "d1" by which the front end 94 of the patterning member 66 projects beyond the discharge end 64, can be varied from patterning member to patterning member in order to achieve gasket beads of varying heights or thicknesses. As such, gasket material beads of various shapes and thicknesses can be formed with such tool 62 simply by removing and interchanging patterning members.

In recapitulation, a method and a device or tool has been provided for forming or molding a patterned gasket seal onto a surface such as the interface surface between a printhead and an ink supply unit of a thermal ink jet print cartridge. Unlike a photo-patterning process, the method and tool of the present invention is relatively inexpensive, and unlike a screen printing process, the method and tool of the present invention does not clog during use as do screens in a screen-printing process. The tool of the present invention is easily maintained, and allows for simple alterations in the geometry of the internally located patterning member thereby enabling the formation of gasket material beads of various desired sizes and thicknesses. In the manufacture of a print cartridge as above, beads as such can be formed in situ on the surface 44A just before the surface 44A is sealed to an ink supply unit. The beads are therefore still flowable and wet.

It is, therefore, apparent that there has been provided in accordance with the present invention, a method and tool for forming a patterned gasket that fully overcomes the disadvantages of screen-printing or photo-patterning gaskets. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A tool for forming a patterned gasket on a surface, the tool comprising:
    (a) a first portion having a discharge end and a first recess defining a first recess surface, said first recess including a first recess section, a second recess section deeper than said first recess section, and an intermediate recess section connecting said first recess section and said second recess section;
    (b) a second portion having a discharge end and a second recess defining a second recess surface, said second recess including a first recess section, a second recess section deeper than said first recess section, and an intermediate recess section connecting said first recess section and said second recess section, said second portion being matable with said first portion;
    (c) a gasket material flow path formed by said first and said second recess surfaces of said first and said second portions mated together, said flow path including a chamber section formed by said first recess sections of said first and said second portions; and
    (d) a gasket patterning member for mounting within said chamber section of said gasket material flow path, said patterning member, when mounted within said chamber section, defining with said first and said second recess surfaces a patterned extrusion opening through said discharge ends of said first and said second portions for extruding a patterned flow of gasket material.

2. The tool of claim 1, including mounting means within said chamber section of said flow path for mounting said patterning member.

3. The tool of claim 1, wherein said chamber section of said flow path has a cross-sectional area greater than a cross-sectional area of said patterning member.

4. The tool of claim 1, wherein said patterning member is mounted removably within said chamber section.

5. The tool of claim 1, wherein said patterning member and said first and said second portions are made of a non-sticking material.

6. The tool of claim 1, wherein said patterning member has an in-path dimension greater than that of said chamber section so that an end of said patterning member when mounted, projects beyond a common plane of said discharge ends of said first and said second portions.

7. The tool of claim 1, wherein said material flow path includes a reservoir section defined by said second recess sections of said first and said second portions for absorbing fluctuations in material inlet pressures, said reservoir section being upstream of said chamber section, relative to gasket material flow.

8. The tool of claim 2, wherein said mounting means is offset significantly from said discharge end of said first and said second portions.

9. The tool of claim 2, wherein said mounting means includes a plurality of interlocking of tabs.

10. The tool of claim 2, wherein said mounting means includes a plurality of first tabs formed on said first and said second recess surfaces.

11. The tool of claim 3, wherein said cross-sectional area of said chamber section is generally rectangular.

12. The tool of claim 3, wherein said cross-sectional area of said patterning member is generally rectangular.

13. The tool of claim 10, wherein said patterning member includes a plurality of second tabs formed thereon for interlocking with said plurality of first tabs on said first and said second recess surfaces.

14. A method of producing a patterned gasket bead having a desired size and thickness on a surface, the method comprising the steps of:
   (a) forming a gasket material flow path including a reservoir section for absorbing fluctuations in inlet pressure of gasket material and a chamber section to and through discharge ends of a pair of removably mated gasket tool portions;
   (b) mounting a gasket patterning member inside the chamber section to project beyond the discharge ends and define a patterned extrusion opening and a desired size and thickness of a gasket bead through the discharge ends; and
   (c) injecting flowable gasket material into the flow path for flow across the patterning member towards the discharge ends positioned proximate the surface, and extruding a patterned gasket bead of the desired size and thickness through the patterned extrusion opening onto the surface.

15. The method of claim 14, wherein said step of forming the gasket material flow path includes a step of making the reservoir section deeper than the chamber section.

16. The method of claim 15, wherein said step of injecting flowable gasket material includes first filling up the reservoir section with the flowable gasket material so as to absorb any fluctuations in inlet pressure of the flowable gasket material.

17. The method of claim 16, wherein said step of forming the gasket material flow path includes forming an inclined intermediate section connecting the reservoir section and the chamber section for increasing gasket material flow pressure into the chamber section.

18. The tool of claim 10, wherein said intermediate recess sections of said first and said second portions are inclined from said second recess sections to said first recess sections of said first and said second portions for increasing gasket material flow pressure into said chamber section.

19. The tool of claim 12, wherein said patterning member includes flanges for spacing edges of said patterning member from edges of said chamber section.

20. The tool of claim 19, wherein said flanges are formed on a rear end, relative to gasket material flow, of said patterning member.

* * * * *